US007930503B2

(12) United States Patent
Angelo et al.

(10) Patent No.: US 7,930,503 B2
(45) Date of Patent: Apr. 19, 2011

(54) METHOD AND APPARATUS FOR OPERATING MULTIPLE SECURITY MODULES

(75) Inventors: Michael F. Angelo, Houston, TX (US); Larry N. McMahan, Fremont, CA (US); Richard D. Powers, Highland Village, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 547 days.

(21) Appl. No.: 10/764,918

(22) Filed: Jan. 26, 2004

(65) Prior Publication Data
US 2005/0166024 A1 Jul. 28, 2005

(51) Int. Cl.
G06F 13/10 (2006.01)
(52) U.S. Cl. ........................................................ 711/164
(58) Field of Classification Search .................. None
See application file for complete search history.

(56) References Cited

U.S. PATENT DOCUMENTS

| | | | |
|---|---|---|---|
| 5,101,492 A | 3/1992 | Schultz et al. |
| 5,159,533 A | 10/1992 | Kuang |
| 5,175,670 A | 12/1992 | Wang |
| 5,224,019 A | 6/1993 | Wong et al. |
| 5,249,279 A | 9/1993 | Schmenk et al. |
| 5,271,152 A | 12/1993 | Murphy |
| 5,331,646 A | 7/1994 | Krueger et al. |
| 5,333,305 A | 7/1994 | Neufeld |
| 5,363,273 A | 11/1994 | Ma |
| 5,408,644 A | 4/1995 | Schneider et al. |
| 5,440,716 A | 8/1995 | Schultz et al. |
| 5,490,342 A | 2/1996 | Rutterman et al. |
| 5,522,065 A | 5/1996 | Neufeld |
| 5,586,274 A | 12/1996 | Bryg et al. |
| 5,592,648 A | 1/1997 | Schultz et al. |
| 5,668,971 A | 9/1997 | Neufeld |
| 5,737,744 A | 4/1998 | Callison et al. |
| 5,748,888 A | 5/1998 | Angelo et al. |
| 5,748,940 A | 5/1998 | Angelo et al. |
| 5,778,070 A | 7/1998 | Mattison |
| 5,822,184 A | 10/1998 | Rabinovitz |
| 5,844,986 A | 12/1998 | Davis |

(Continued)

FOREIGN PATENT DOCUMENTS

EP 0674273 A1 9/1995

(Continued)

OTHER PUBLICATIONS

"Trusted Computing Platform Alliance (TCPA) Trusted Platform Module Protection Profile," Version 1.9.7, Published Jul. 1, 2002 (Prepared by TCPA Membership).

(Continued)

*Primary Examiner* — Duc T Doan

(57) ABSTRACT

The disclosed embodiments relate to a security module and a method of operating a security module. The method may comprise the acts of detecting a second security module, determining whether a key associated with the second security module is available to the first security module, and obtaining the key associated with the second security module if the key associated with the second security module is not available to the first security module. The security module may comprise a detector that is adapted to detect another security module and determine whether one of a plurality of keys is associated with the other security module, and a device that obtains at least one key associated with the other security module if the one of the plurality of keys is not associated with the other security module.

2 Claims, 8 Drawing Sheets

U.S. PATENT DOCUMENTS

| | | | |
|---|---|---|---|
| 5,848,418 | A | 12/1998 | de Souza et al. |
| 5,850,559 | A | 12/1998 | Angelo et al. |
| 5,853,422 | A | 12/1998 | Huebsch et al. |
| 5,859,911 | A | 1/1999 | Angelo et al. |
| 5,887,131 | A | 3/1999 | Angelo |
| 5,909,691 | A | 6/1999 | Schultz et al. |
| 5,923,754 | A | 7/1999 | Angelo et al. |
| 5,944,821 | A | 8/1999 | Angelo |
| 5,949,882 | A | 9/1999 | Angelo |
| 5,953,422 | A | 9/1999 | Angelo et al. |
| 5,955,722 | A | 9/1999 | Kurz et al. |
| 5,960,084 | A | 9/1999 | Angelo |
| 5,974,250 | A | 10/1999 | Angelo et al. |
| 5,974,438 | A | 10/1999 | Neufeld |
| 6,003,144 | A | 12/1999 | Olarig et al. |
| 6,009,524 | A | 12/1999 | Olarig et al. |
| 6,026,016 | A | 2/2000 | Gafken |
| 6,032,257 | A | 2/2000 | Olarig et al. |
| 6,041,412 | A * | 3/2000 | Timson et al. .................... 726/3 |
| 6,057,965 | A | 5/2000 | Angelo et al. |
| 6,061,794 | A | 5/2000 | Angelo et al. |
| 6,085,299 | A | 7/2000 | Angelo et al. |
| 6,116,509 | A | 9/2000 | Angelo et al. |
| 6,118,589 | A | 9/2000 | Angelo et al. |
| 6,119,228 | A | 9/2000 | Angelo et al. |
| 6,125,446 | A | 9/2000 | Olarig et al. |
| 6,131,174 | A | 10/2000 | Fischer et al. |
| 6,134,591 | A | 10/2000 | Nickles |
| 6,167,538 | A | 12/2000 | Neufeld et al. |
| 6,182,892 | B1 | 2/2001 | Angelo et al. |
| 6,199,167 | B1 | 3/2001 | Heinrich et al. |
| 6,263,431 | B1 | 7/2001 | Lovelace |
| 6,288,843 | B1 | 9/2001 | Angelo et al. |
| 6,298,411 | B1 | 10/2001 | Giacalone |
| 6,308,265 | B1 | 10/2001 | Miller |
| 6,311,273 | B1 | 10/2001 | Helbig, Sr. et al. |
| 6,330,674 | B1 | 12/2001 | Angelo et al. |
| 6,363,449 | B1 | 3/2002 | Sides et al. |
| 6,370,649 | B1 | 4/2002 | Angelo et al. |
| 6,400,823 | B1 | 6/2002 | Angelo |
| 6,401,208 | B2 | 6/2002 | Davis et al. |
| 6,418,533 | B2 | 7/2002 | Angelo et al. |
| 6,442,631 | B1 | 8/2002 | Neufeld et al. |
| 6,460,121 | B1 | 10/2002 | Bonola |
| 6,463,495 | B1 | 10/2002 | Angelo et al. |
| 6,467,048 | B1 | 10/2002 | Olarig et al. |
| 6,470,443 | B1 | 10/2002 | Emer et al. |
| 6,477,648 | B1 | 11/2002 | Schell et al. |
| 6,502,203 | B2 | 12/2002 | Barron et al. |
| 6,505,268 | B1 | 1/2003 | Schultz et al. |
| 6,567,901 | B1 | 5/2003 | Neufeld |
| 6,581,162 | B1 | 6/2003 | Angelo et al. |
| 6,609,204 | B1 | 8/2003 | Olarig et al. |
| 6,625,729 | B1 | 9/2003 | Angelo et al. |
| 6,625,730 | B1 | 9/2003 | Angelo et al. |
| 6,633,978 | B1 * | 10/2003 | Angelo et al. ................ 713/100 |
| 6,647,415 | B1 | 11/2003 | Olarig et al. |
| 6,782,349 | B2 * | 8/2004 | Challener et al. ............ 702/186 |
| 7,187,771 | B1 * | 3/2007 | Dickinson et al. ............ 380/228 |
| 2003/0105965 | A1 * | 6/2003 | Challener .................... 713/184 |
| 2003/0110372 | A1 * | 6/2003 | Proudler ...................... 713/150 |
| 2003/0174842 | A1 * | 9/2003 | Challener .................... 380/277 |
| 2005/0138434 | A1 * | 6/2005 | Catherman et al. ........... 713/202 |

FOREIGN PATENT DOCUMENTS

| | | | |
|---|---|---|---|
| EP | 0674273 | B1 | 5/2000 |
| EP | 0851335 | B1 | 10/2003 |

OTHER PUBLICATIONS

"Trusted Computing Group (TCG) Main Specification," Version 1.1a, Published Sep. 2001 (Prepared by Trusted Computing Group).

U.S. Appl. No. 10/660,335, Angelo et al.

Angelo et al., "Method and Apparatus to Provide Enhanced Computer Protection," U.S. Appl. No. 09/540,697, filed Mar. 31, 2000.

Angelo et al., "Method and Apparatus for Providing Enhanced Computer Security," U.S. Appl. No. 09/540,812, filed Mar. 31, 2000.

Angelo et al., "Comuputer System Having Security Features," U.S. Appl. No. 09/540,811, filed Mar. 31, 2000.

Neufeld, E. David, "Method and Apparatus for Preserving the Integrity of Management Subsystem Envrionment," U.S. Appl. No. 09/967,268, filed Sep. 28, 2001.

Neufeld, et al., "Method and Apparatus for Generating a Strong Random Number for Use in a Security Subsystem for a Processor-Based Device," U.S. Appl. No. 09/966,890, filed Sep. 28, 2001.

Brown et al., "Method and Apparatus for Preserving a Strong Random Number Across Battery Replacement in a Security Subsystem," U.S. Appl. No. 10/037,511, filed Jan. 4, 2002.

Franz et al., "Method and Apparatus for Initiating Strong Encryption Using Existing SSL Connection for Secure Key Exchange," U.S. Appl. No. 10/037,491, filed Jan. 4, 2002.

Reeves et al., "Virtual Media from a Directory Service," U.S. Appl. No. 10/038,239, filed Jan. 4, 2002.

Reeves et al., "Method and Apparatus for Increasing the Functionality and Ease of Use of Lights Out Management in a Directory Enabled Environment," U.S. Appl. No. 10/037,684, filed Jan. 4, 2002.

Franz et al., "Method and Apparatus for Identifying the Write Protect Status of a Diskette," U.S. Appl. No. 10/043,478, filed Jan. 10, 2002.

Angelo et al., "Method and Apparatus for Using a MAC Address as Unique Machine Parameters to Identify Equipment," U.S. Appl. No. 10/184,146, filed Jun. 28, 2002.

Neufeld et al., "Method and Apparatus to Provide Secure Communications Between Systems," U.S. Appl. No. 10/632,500, filed Aug. 1, 2003.

* cited by examiner

METHOD AND APPARATUS FOR OPERATING MULTIPLE SECURITY MODULES

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of processor-based systems, such as computer systems, it may be desirable for information to be transferred from one system to another system via a network. Networks may be arranged to allow information, such as files or programs, to be shared across an office, a building, or any geographic boundary. While these networks may be used to increase productivity, they also expose computer systems to security risks, such as interception of confidential data by unauthorized parties, loss of data integrity, unauthorized access to the computer systems on the network, and the like.

A wide variety of security measures may be employed to secure data in a networked environment. For example, security components or modules may be used to attest to the settings within the computer system. In other words, the security modules may certify that the computer system is a valid system, which may be trusted by other systems. Such a security module may be utilized by the computer system to seal information on the computer system to protect the information. The sealed information may be encrypted with a unique key from one of the security modules to prevent unauthorized access. However, if multiple security modules are utilized in a single computer system, different security modules may seal the information. Other security modules may not be able to unseal the information because the key utilized to encrypt the information is not known. As a result, sealed information may be undecipherable by the computer system or other security modules if the key used to seal the information is not known. The inability to decipher the sealed information may result in problems that prohibit effective operation of the computer system.

For example, if two security modules are utilized in a computer system, each of the security modules may utilize its own keys to encrypt or seal information for the computer system. If one of the security modules is damaged, access to the information that was stored in or for the security module may not be obtainable. As such, the loss of a single security module may hinder the operation of the computer system as a whole and prevent access to specific information within the computer system. In addition, with multiple security modules in a single computer system, the security modules may not be able to determine which security module sealed the information. As a result, the security modules may be unable to verify that the appropriate security module key has been used to unseal the information.

BRIEF DESCRIPTION OF THE DRAWINGS

Exemplary embodiments of the present invention may be apparent upon reading of the following detailed description with reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Trusted Computing Platform Alliance, which includes the assignee of the present application, is developing specifications that are intended to improve security for computing systems. Two such specifications under development are the Trusted Computing Platform Alliance Trusted Platform Module Protection Profile Specification and the Trusted Computing Group ("TCG") Main Specification, which are hereby incorporated by reference. These specifications refer to a trusted platform module ("TPM"), which is defined as a module that includes protected functionality and shielded locations.

Embodiments of the present invention may provide a methodology for operating multiple security modules, such as TPMs, in a computer system. Because each of the security modules may utilize a unique key to seal or encrypt information, the security modules may gain access to the keys during the initialization of the system. As a result, each of the security modules may be able to unseal information that may be sealed by another security module. To verify that the security module is utilizing the appropriate key to unseal the information, the information may be sealed with an identifier during the sealing process. By utilizing the identifier, the security module may verify that the key used to unseal the information is the appropriate key. As such, a security module may unseal information that was sealed by other security module.

Figure 1:
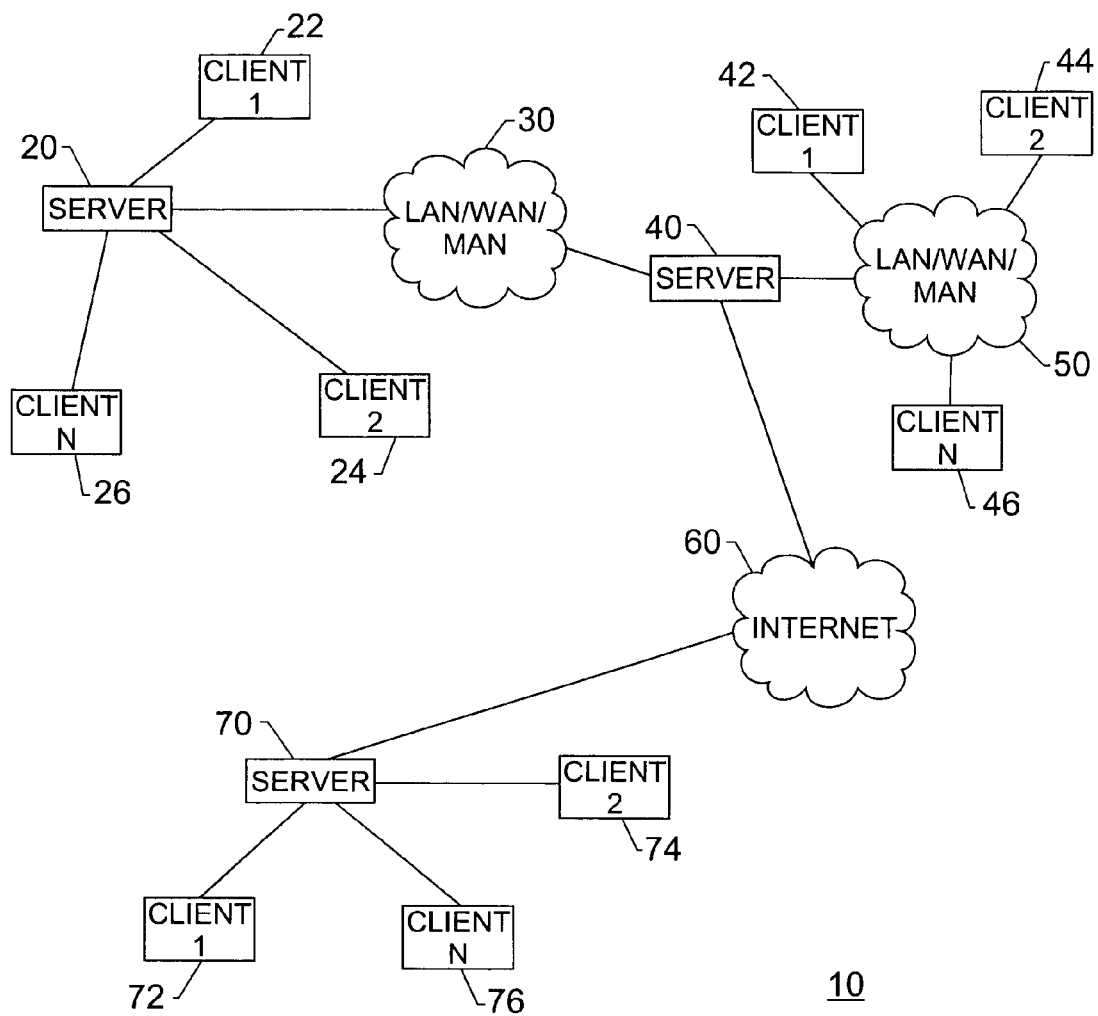
FIG. 1 is a block diagram illustrating a network in accordance with embodiments of the present invention.

Referring initially to FIG. 1, a block diagram of a computer network architecture is illustrated and designated using a reference numeral 10. A server 20 may be connected to a plurality of client computers 22, 24 and 26. The server 20 may be connected to as many as "n" different client computers. The magnitude of "n" may be a function of the computing power of the server 20. Each client computer in the network 10 may be a functional client computer and may be a desktop personal computer ("PC"), a notebook PC, a tablet PC, a personal digital assistant ("PDA"), or the like.

The server 20 may be connected via a network infrastructure 30, which may include a combination of hubs, switches, routers, or the like. While the network infrastructure 30 is illustrated as being either a local area network ("LAN"), a wide area network ("WAN"), or a metropolitan area network ("MAN"), those skilled in the art will appreciate that the network infrastructure 30 may assume other forms or may even provide network connectivity through the Internet. As described below, the network 10 may include other servers as well, which may be dispersed geographically with respect to each other to support client computers in other locations.

The network infrastructure 30 may connect the server 20 to a server 40, which may be representative of any other server in the network environment. The server 40 may be connected to one or more client computers 42, 44, and 46. As illustrated in FIG. 1, a network infrastructure 50, which may include a LAN, a WAN, a MAN, or other network configuration, may be used to connect the client computers 42, 44 and 46 to the server 40. The server 40 may additionally be connected to the Internet 60, which may be connected to a server 70. The server 70 also may be connected to one or more client computers 72, 74 and 76.

In the network infrastructures 30, 50 and 60, the systems, such as the client computers 22-26, 42-46 and 72-76 and servers 20, 40, 70, may be subject to improper access attempts, such as hacker attacks, disruption of service attacks, introduction of malicious code, viruses and the like. These attacks may result in a loss of productivity, revenue, data, and/or confidential information that is stored on one of the systems. To protect the data and the system, security modules, such as TPMs, may be utilized to provide enhanced security. An exemplary security module, which provides this functionality, is illustrated in FIG. 2.

Figure 2:
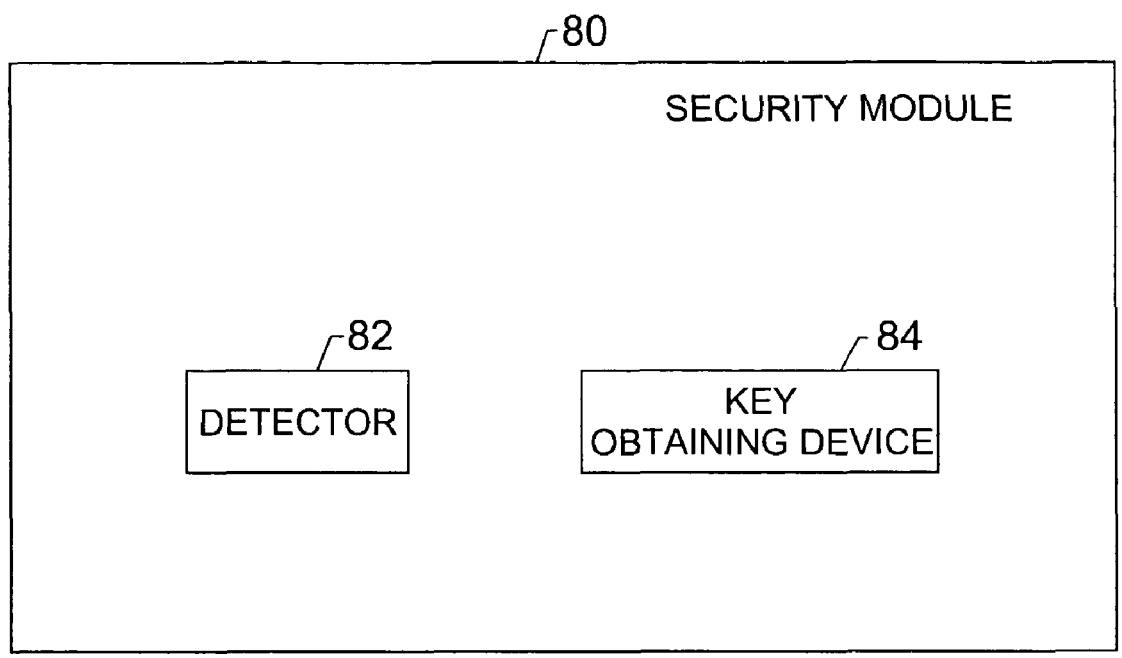
FIG. 2 is a block diagram illustrating an exemplary security module in accordance with embodiments of the present invention.

FIG. 2 is a block diagram of an exemplary security module in accordance with the present invention. The security module 80 may include various components, such as a detector 82 and a key obtaining device 84 along with other components (not shown). The detector 82 and the key obtaining device 84 may be implemented in hardware, software, or any combination thereof, which may be individual components or combined into a single device. The detector 82 may be utilized to determine if another security module is present and determine if the security detector 82 has the key or keys that are associated with the other security module, which is discussed below in greater detail. The key obtaining device 84 may obtain a key or keys for the other security module if none of the keys are associated with the other security module. The use and interaction of these various components is further explained below.

The detector 82 and the key obtaining device 84 may be utilized by the security module 80 to enhance the security of the system. For example, each of the client computer systems and servers, which are described in FIG. 1, may include a TPM to provide integrity for that system on the network 30, 50 or 60. However, with a single TPM, the user may lose access to the system or information on the system if the TPM fails. The detector 82 may be utilized by the TPM to find other TPMs and determine if it has the keys that are associated with the other TPM. If it has the keys from the other TPM, then the TPM may access and decrypt information stored by that TPM. If the TPM does not have keys associated with the other TPM, then the key obtaining device 84 may obtain a key or keys from the other TPM. As such, to provide fault tolerance, multiple TPMs may be implemented within a system to enhance the security and reliability of the system.

Figure 3:
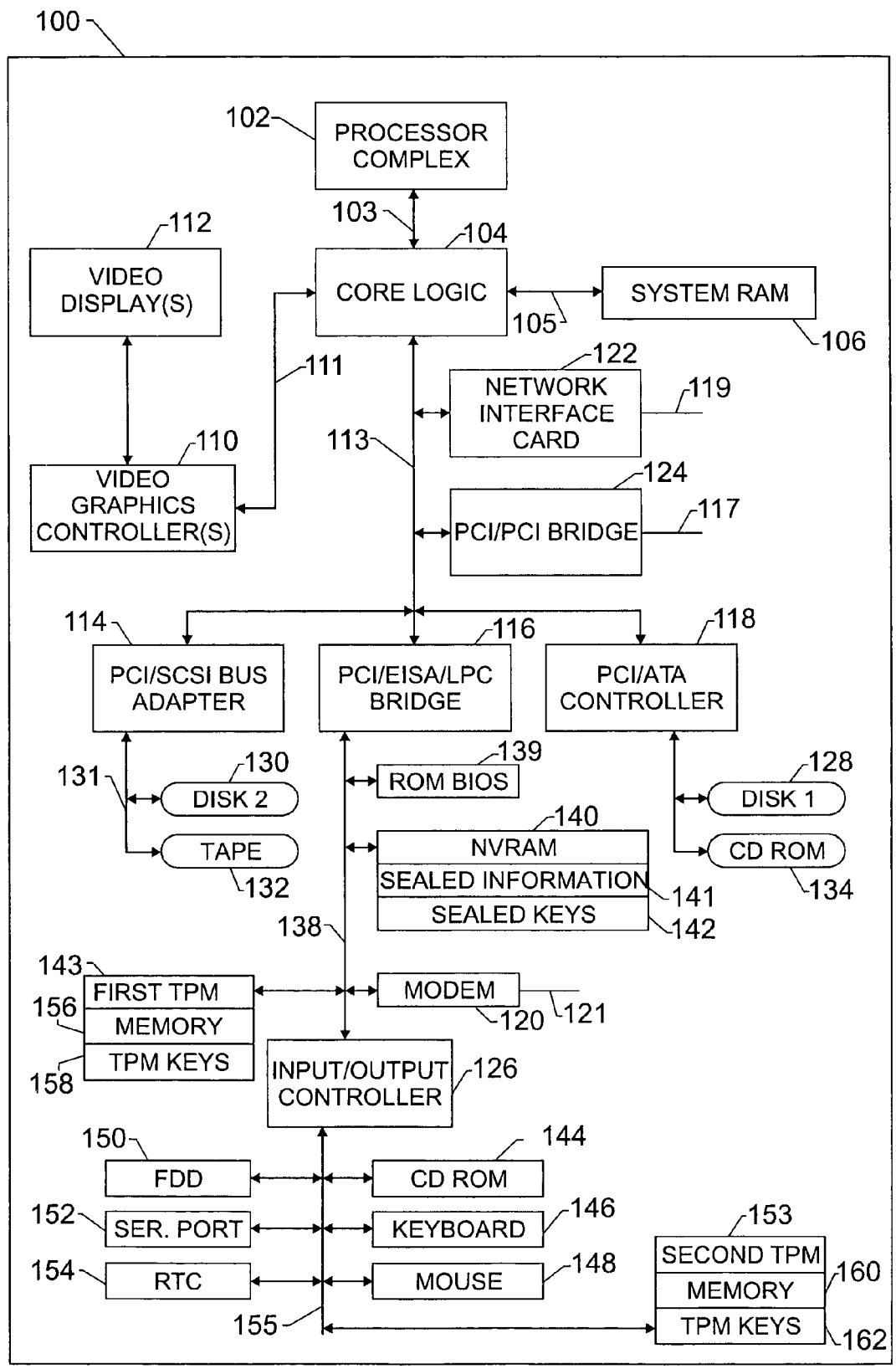
FIG. 3 is a block diagram illustrating a computer system with multiple security modules in a network in accordance with embodiments of the present invention.

FIG. 3 is a block diagram illustrating an exemplary computer system with multiple security modules in accordance with embodiments of the present invention. The computer system is generally referred to by the reference numeral 100. The architecture of the computer system 100 is given for purposes of illustration only, as one example of a computer system in which embodiments of the present invention may be employed. It should be noted that the security modules, such as security modules 80 (FIG. 2) or TPMs, may be any type of security module that is used to enhance security of the system. Additionally, it should be appreciated that any number of security modules may be utilized by the system 100, and connected in a variety of locations within the computer system 100. Two security modules are depicted in the system illustrated in FIG. 3.

The computer system 100 may comprise a processor complex 102, which may include one or more central processing units ("CPUs"). A core logic chipset 104, which may manage a variety of functions on behalf of the processor complex 102, may be connected to the processor complex via a processor interface point-to-point link or a processor bus 103.

The core logic chipset 104 may be connected via memory bus 105 to a system random access memory 106, which may comprise static random access memory ("SRAM"), dynamic random access memory ("DRAM") or other suitable memories. The memory 106 may be a shared system memory to hold memory resident files or information. A video graphics controller 110 may be connected to the core logic chipset 104 via a video bus 111 to provide a signal that produces a display image on a video display 112.

A bus 113, such as a peripheral component interface ("PCI") bus or the like, may connect the core logic chipset 104 to a variety of system devices, such as a network interface card 122 and a PCI/PCI bridge 124. The network interface card 122 may provide communication capability to the computer system 100 via a communication bus 119. The communication bus 119 may be connected to other computer systems, as discussed above. The PCI/PCI bridge 124 may provide capacity for additional PCI devices on a PCI bus 117.

A PCI/SCSI bus adapter 114 may provide access to SCSI devices such as a disk drive 130 and a tape drive 132 via a SCSI bus 131. A PCI/ATA controller 118 may provide access to additional devices such as a disk drive 128 and a CD ROM drive 134. A PCI/EISA/LPC bridge 116 may provide access to system devices, such as a read only memory basic input/output system ("ROM BIOS") 139, a non-volatile memory 140 ("NVRAM"), a modem 120, a first trusted platform module ("TPM") 143 or the like via a bus 138. The operation of the first TPM 143 is discussed below in greater detail. The NVRAM 140 may be flash memory or the like and may include sealed information 141 and/or sealed keys 142. The sealed information 141 and the sealed keys 142 are also discussed below. The BIOS 139 may also be system firmware that is stored in ROM. The BIOS 139 may be referred to as the core root of trust for measurement ("CRTM"), which is the basis for insuring the integrity of the computer system 100. As such, the BIOS 139 provides the foundation for trust, which makes and reports trust measurements of other components external to the first TPM 143. The modem 120 may provide communication access via a phone line 121. An input/output controller 126, which may be connected to the bus 138, may provide access to system devices such as a CD ROM drive 144, a keyboard 146, a mouse 148, a floppy disk drive 150, a serial port 152, a second TPM 153, a real time clock ("RTC") 154, and the like, via a bus 155.

The TPMs 143 and 153 may provide the computer system 100 with enhanced integrity because they may be used to validate the BIOS or system firmware along with other code. The first TPM 143 may include an input/output interface, a processor, and memory 156 that is used to store TPM keys 158. Similarly, the second TPM 153 may include an input/output interface, a processor, and memory 160 that is used to store TPM keys 162. These various components may be utilized to perform the functionality of the detector 82 and the device 84, which are discussed above in FIG. 2. The input/output interfaces may be utilized by the TPMs 143 and 153 to communicate with other components within the computer system 100 or to receive power. The processors in the TPMs 143 and 153 may be utilized to provide cryptographic capabilities, such as hashing, random number generation, key generation, and encryption/decryption. The memories 156 and 160, which may be non-volatile memory, may be divided into registers and other memory sections. The memories 156 and 160 may be utilized to store the keys, such as the TPM keys 158 and 162, and hashed information relating to code or configurations of the computer system 100. The TPM keys 158 and 162 may be encryption keys, such as private keys, that are associated with other TPMs 143 and 153 within the computer system 100, as discussed below. Because each of the TPMs 143 and 153 operate with the computer system 100, the TPMs 143 and 153 may attest to the integrity of the computer system 100. In other words, the TPMs 143 and 153 may certify that the computer system 100 is a valid system that may be trusted.

To provide enhanced security and establish root trust for the computer system, various security measures may be performed by the TPMs 143 and 153. For instance, each TPM may include endorsement keys, which are a private and public key pair that are used to encrypt/decrypt information. The endorsement keys may be unique to a particular TPM, and may be assigned to the TPM when it is manufactured. Also, an attestation identity key may be used to provide platform authentication along with a user key that may be used to provide privacy to a user of the TPMs 143 and 153. In addition to the keys, the TPMs 143 and 153 may include hashing capabilities and a random number generator to further enhance the security of the computer system by hashing information, such as code or configuration information about one or more system components.

The TPMs 143 and 153 may follow an initialization when they are first activated within the computer system 100. This initialization, which shall be referred to as TPM initialization, is different from the initialization that is performed on devices in the computer system 100 when the computer system 100 is booted. That initialization shall be referred to as system initialization. During the TPM initialization, system state information and keys may be stored in the memory 156 or 160 of the TPM. The TPM initialization process may include the validation of the BIOS 139 by the TPM 143 or 153 to establish trust with the BIOS 139, and the validation of other code and configurations by the BIOS 139 to build trust within the computer system 100. During the TPM initialization process, the ownership and identity of the TPM 143 or 153 in relation to the computer system 100 may be established. Ownership may be established by providing or generating keys for the TPM 143 or 153 and measuring the code and configuration of the computer system 100. The TPM initialization process is shown in greater detail in FIG. 4.

Figure 4:
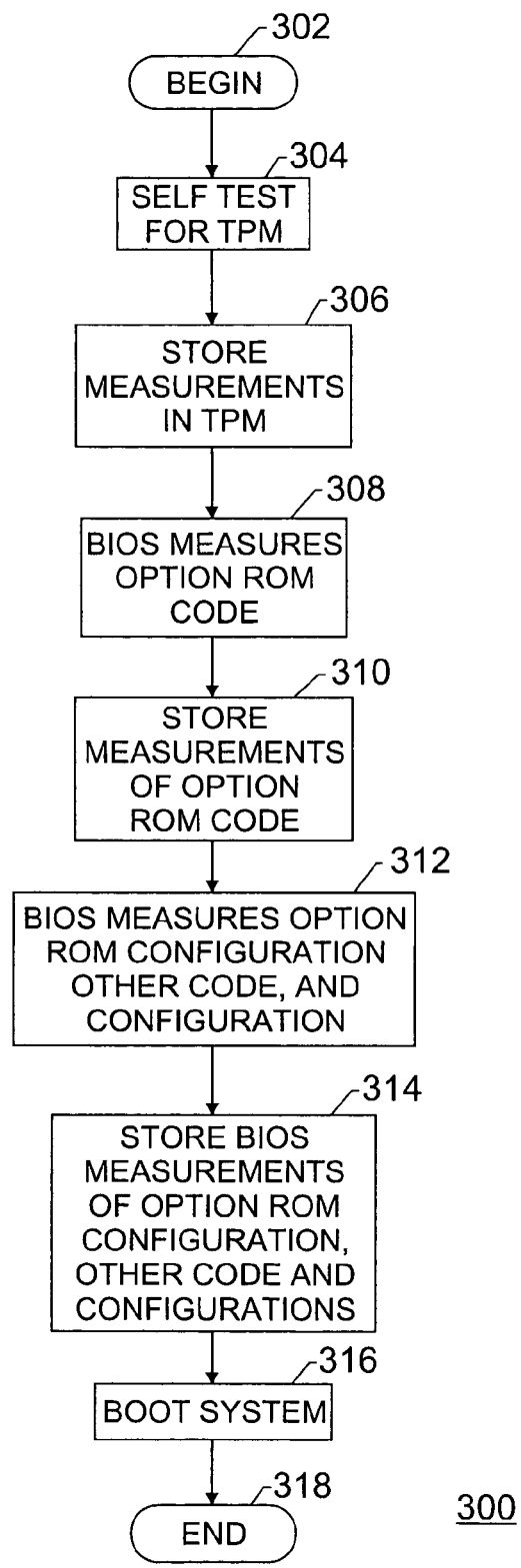
FIG. 4 is a process flow diagram illustrating an exemplary initialization of a security module in accordance with embodiments of the present invention.

FIG. 4 is a process flow diagram illustrating an exemplary initialization of a security module in accordance with embodiments of the present invention. The process is generally referred to by the reference numeral 300. Each TPM in a given system may undergo the TPM initialization process illustrated in FIG. 4. The process begins at block 302. At block 304, the TPM may perform a self-test. The self-test may include verifying the operation of the internal components and information within the TPM. During the self-test, the TPM may generate keys, such as endorsement keys, for example. The keys may include private and public keys that may be used by the TPM to encrypt/decrypt different information. In addition, the self-test may include measuring various code or configurations, such as the BIOS 139 (FIG. 3), which may include other system firmware, and the BIOS boot block, if present. The measurement of a command or code may include cryptographically hashing the code to create integrity metrics. The hash may be a digital signature that provides authentication for the specific TPM through the use of private keys. At block 306, the TPM may store the measurements in its internal memory, such as memory 156 and 160 (FIG. 3). The measurements may be stored in specific registers that are utilized by the TPM to store information relating to code or configurations, such as the BIOS and/or the BIOS boot block, if present.

Once the BIOS has been measured by the TPM, the BIOS may be utilized to measure option read-only memory ("ROMs") and hardware, as shown in block 308. The option ROM may include programs associated with devices attached to system buses. The hardware may include various buses or devices within the computer system, as discussed above in FIG. 3. At block 310, the measurements from the BIOS of the option ROMs and hardware ate stored within the TPM. Then, the BIOS may measure the option ROM configuration, other code and configurations, as shown in block 312. The other code and configurations may include the operating system ("OS") loader, the disk boot record, other code and data utilized to prepare the OS, state transitions, and/or wake events. After the measurements are made, the TPM may store the measurements in its internal memory, such as memory 156 or 160 (FIG. 3), as shown in block 314. Next, the computer system boots, as shown in block 316. The booting of the system may include activating or handing control of the system to the operating system. Accordingly, the process ends at block 318.

If multiple TPMs are deployed within a computer system, each TPM may be used to seal information. The information may not be accessible by other TPMs because each TPM utilizes a unique key to encrypt or seal information within the system. For the sealed information, such as sealed information 141, to be decrypted or unsealed properly, the key from the TPM that sealed the information is used to unseal the sealed information. In the situation where a TPM fails, the other TPMs may not be able to unseal the sealed information because the sealed information was sealed with a unique key that they do not have. As a result, the sealed information is lost and TPMs cannot be used to back up each other because the keys are unique to each TPM.

Figure 5:
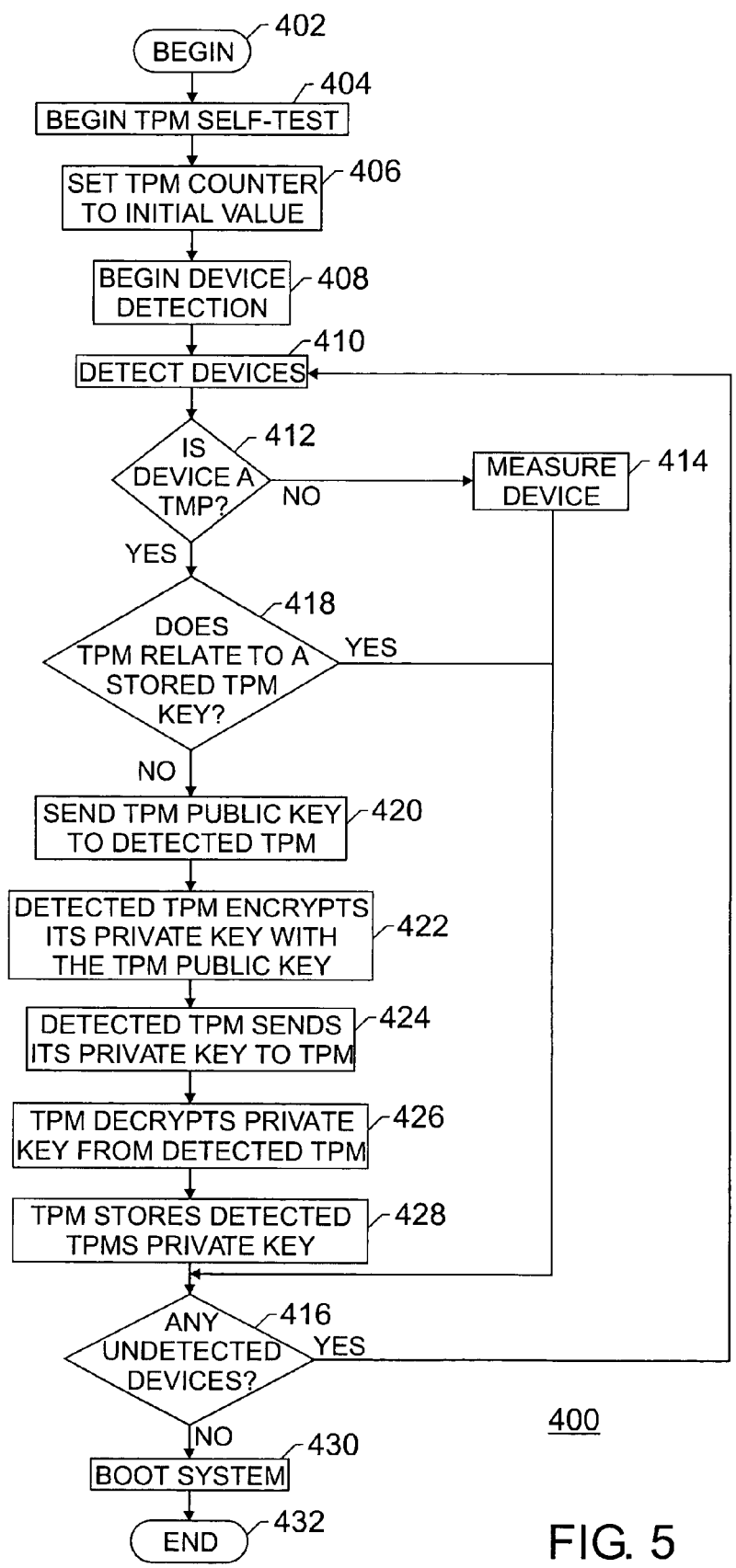
FIG. 5 is a process flow diagram illustrating an initialization process to distribute keys between security modules in accordance with embodiments of the present invention.

Accordingly, for each of the TPMs to unseal information sealed by another TPM, a mechanism may be utilized to share the keys from one TPM with other TPMs. This mechanism may be utilized when the TPMs are initializing to determine other TPMs within the system. Accordingly, a process flow diagram illustrating an initialization process to distributes keys between TPMs, such as TPMs 143 and 153 (FIG. 3), in accordance with embodiments of the present invention may be utilized, as shown in FIG. 5. The process flow diagram is generally referred to by the reference numeral 400. To distribute the keys between the TPMs, a TPM may receive keys from other TPMs during the initialization process. Beneficially, by sharing the keys between the TPMs, each TPM may decrypt information that is sealed by another TPM, regardless of the TPM that encrypted the information. As a result, the sealed information, such as sealed information 141 (FIG. 3), stored on the system, such as computer system 100, is not lost when a TPM fails because another TPM has keys to unseal the sealed information.

The process begins at block 402. At block 404, an originating TPM may begin a self-test, such as the self-test discussed above in block 304 (FIG. 4). At block 406, a TPM counter may be set to an initial value. The TPM counter may be a setting in memory that is utilized to associate a number with another TPM associated with the system. For instance, the TPM counter may be set to "0" to indicate that no other TPMs are attached to the system.

The device detection process begins at block 408. At block 410, the originating TPM may detect other devices within the system. Once a device is detected, the originating TPM may determine if the device is another TPM. If the device is not another TPM, the device may be measured in block 414. The measuring of device may be similar to the measurement discussed in blocks 306-314 (FIG. 4). Once the device has been measured, the originating TPM may determine if any other devices are present, as shown in block 416. However, if the detected device is another TPM, the originating TPM may determine if the detected TPM relates to a stored TPM key, as shown in block 418. The stored TPM key, which may be sealed keys 142 (FIG. 3), may be one of a group of keys that is stored in memory, such as the NVRAM 140 or memory 156 or 160 (FIG. 3). If the originating TPM has a stored TPM key that is associated to the detected TPM, then the originating TPM may determine if other undetected devices are present, as discussed above with regard to block 416.

However, if the detected TPM does not relate to a stored TPM key, then the originating TPM may attempt to get the keys from the detected TPM. The originating TPM may send its public key to the detected TPM, as shown in block 420. The detected TPM may then encrypt its private key, as shown in block 422. The detected TPM may encrypt the private key with the public key from the originating TPM or another key known by the originating TPM to maintain its security. Once the private key for the detected TPM is encrypted, the detected TPM may send its private key to the originating TPM, as shown in block 424. Then, the originating TPM may decrypt the private key send from the detected TPM, as shown in block 426. Once the originating TPM has the private key of the detected TPM, the originating TPM may associate the private key with the detected TPM and store the private key of the detected TPM in memory, as shown in block 428. For instance, the private key of the detected TPM may be stored within the memory 156 or 160 (FIG. 3). Alternatively, the private key of the detected TPM may be encrypted with the private key of the originating TPM and stored in memory, which may be the sealed keys 142 stored in NVRAM 140 (FIG. 3).

Once the originating TPM has stored the private key of the detected TPM, the originating TPM may determine if any other undetected devices are present within the system, as discussed above in block 418. If any undetected devices are present within the system, the originating TPM may detect the other devices, as discussed above in block 410. However, if no undetected devices are present, then the computer system may boot, as shown in block 430. Accordingly, the process ends at block 432. Beneficially, because the keys are shared among the TPMs within the system, each TPM may unseal information stored within the system. However, additional actions may be utilized to provide enhanced security for the TPMs during the initialization process.

Figure 6:
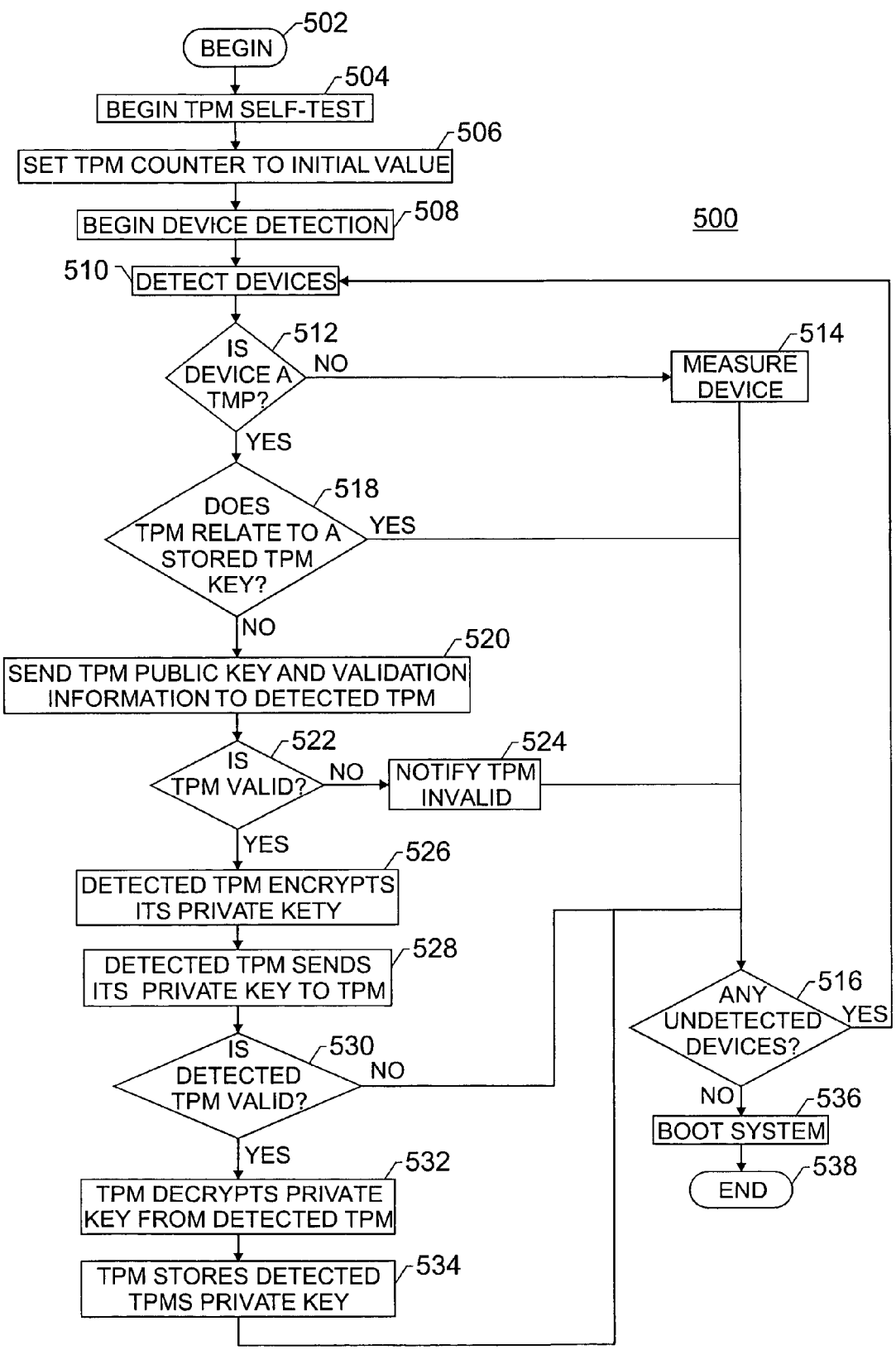
FIG. 6 is a process flow diagram illustrating the use of validation information to provide security between the security modules of FIG. 5 in accordance with embodiments of the present invention.

FIG. 6 is a process flow diagram illustrating the use of validation information to provide security between the security modules of FIG. 5 in accordance with embodiments of the present invention. The process is generally referred to by reference numeral 500. In this process, the TPMs may validate each other during the key sharing process before the keys may be shared between the TPMs. As a result, the key sharing process is enhanced by providing additional verification between the TPMs.

The process begins at block 502. At block 504, the originating TPM may begin a self-test, which may be similar to block 404 (FIG. 5). Then, the TPM counter may be set to an initial value, as shown in block 506. The device detection begins at block 508. At block 510, different devices may be detected by the originating TPM. Once a device is detected, the originating TPM may determine if the detected device is another TPM, as shown in block 512. If the detected device is not another TPM, the device may be measured in block 514, which may be similar to block 414 (FIG. 5). Once the device is measured, the originating TPM may determine if any other undetected devices are present, as shown in block 516. However, if the detected device is another TPM, then the originating TPM may determine if the detected TPM is associated with a stored TPM key, as shown in block 518. If the detected TPM is associated with a stored TPM key, then the key of the detected TPM is already known by the originating TPM. The originating TPM may proceed to determine if any other undetected devices are present in block 516.

However, if the detected TPM is not related to a stored TPM key, then the originating TPM may begin the process of accessing the key from the detected TPM. The process for accessing the key from the detected TPM may include sending the public key of the originating TPM along with validation information to the detected TPM, as shown in block 520. The validation information may include a certificate or other information that may be utilized to validate the identity of the originating TPM. Once the validation information and the public key are received, the detected TPM may determine if the originating TPM is valid, as shown in block 522. The validation of the originating TPM may include verifying a digital signature or a certificate in validation information to authenticate or verify the integrity of the originating TPM. If the detected TPM determines that the originating TPM is invalid, then the detected TPM may notify the originating TPM that it is not valid, as shown in block 524. The notification may include a message or indication that the detected TPM was unable to validate the originating TPM. Then, the originating TPM may determine if any other undetected devices are present in block 516, as previously discussed.

However, if the originating TPM is validated by the detected TPM, the detected TPM may share the private key of the detected TPM with the originating TPM. The detected TPM may encrypt its private key, as shown in block 526. As noted above, the private key of the detected TPM may be encrypted with the originating TPM public key or another known key. The detected TPM may then send its encrypted private key and validation information to the originating TPM, as shown in block 528. The validation information for the detected TPM may include a digital signature or certificate that relates to the detected TPM. Then, the originating TPM may determine if the detected TPM is valid at block 530. The determination whether the detected TPM is valid may be similar to the validation discussed above in block 522. If the detected TPM is invalid, then the originating TPM may determine if any other undetected devices are present, as shown in block 516. However, if the detected TPM is valid, then the originating TPM may decrypt the private key of the detected TPM, as shown in block 532. The originating TPM may store the private key of the detected TPM within memory, as shown in block 534. The private key may be one of the sealed keys 142 or stored within the memory 156 or 160 (FIG. 3) of the originating TPM.

Once the private key of the detected TPM is stored, the originating TPM may determine if any other undetected devices are present in block 516. If any other undetected devices exist, then the originating TPM may detect another device, as discussed above in block 510. However, if no devices are present, then the system may boot, as shown in block 536. Accordingly, the process ends at block 538.

Beneficially, by validating the TPMs, the system is able to provide extra security between the TPMs during the key sharing process. With the new initialization process, the keys may be shared between the TPMs, such as TPMs 143 and 153 (FIG. 3), to allow encrypted or sealed information, such as sealed information 141 (FIG. 3), to be unsealed by either TPM. As a result, the sealed information may be unsealed by other TPMs because the keys are shared between the TPMs.

However, while each TPM may have the keys from other TPMs, it may be unable to determine which key sealed the information. As a result, the TPM may be unable to determine if the information has been unsealed with the appropriate TPM key. Because the TPM that sealed the information may not be clear to the unsealing TPM, a sealing process for identifying the proper TPM key may be utilized to allow another TPM with the appropriate key to verify when the information has been unsealed properly. Accordingly, the sealing process is shown in FIG. 7.

Figure 7:
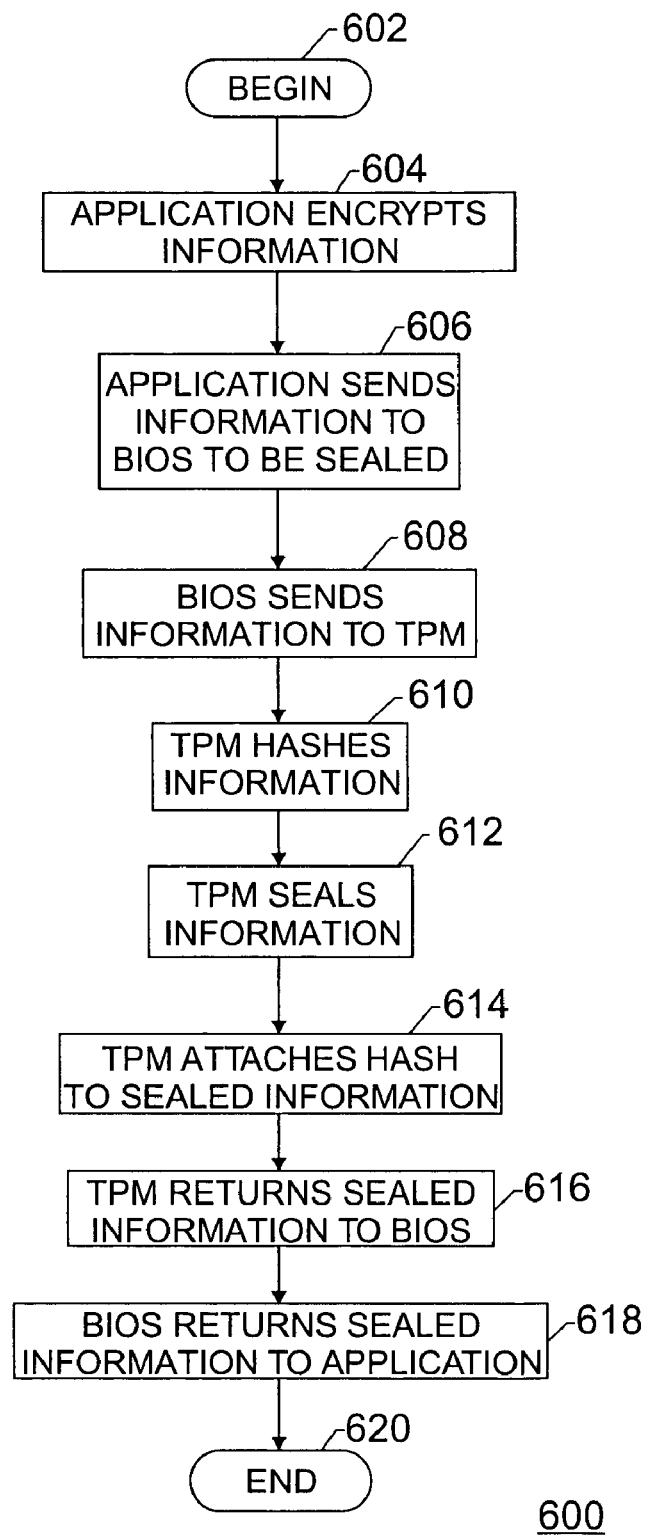
FIG. 7 is a process flow diagram illustrating a process for sealing information in a manner to allow another security module in accordance with embodiments of the present invention.

FIG. 7 is a process flow diagram illustrating a process for sealing information in a manner to allow another security module in accordance with embodiments of the present invention. The sealing process is generally referred to by reference numeral 600. To seal information within the system, each TPM may utilize a private key that is unique to that TPM to seal the information. In the initialization process discussed above, each TPM may have the keys from other TPMs within the system. To verify the appropriate key is being used in the unsealing process, the sealing TPM may attach an identifier in the sealing process to allow the unsealing TPM to verify if the appropriate key was utilized in the unsealing process. The identifier may be a hash of the information or a sealed hash that is associated with the sealed information, such as sealed information 141 (FIG. 3). Beneficially, by sealing information with an identifier, a sealing TPM may determine if the information has been unsealed with the appropriate key.

The process begins at block 602. At block 604, an application may encrypt the information. The application may send the information to be sealed to the BIOS, such as BIOS 139 (FIG. 3), which may include other system firmware, as shown in block 606. Then, the BIOS may send the information to the sealing TPM to be sealed, as shown in block 608. The sealing process within the sealing TPM begins with the sealing TPM hashing the information in block 610. The hash of the information may be the identifier used by a sealing TPM to verify that the key used to unseal the information is proper. Then, the sealing TPM may seal the information, as shown in block 612. The sealing of the information may include encrypting the information with the private key of the sealing TPM. Once the information is encrypted, the sealing TPM may attach the hash to the encrypted information, as shown in block 614. Accordingly, the sealing TPM returns the sealed information to the BIOS in block 616. At block 618, the BIOS returns the sealed information to the application. Then, the process ends at block 620.

It should be noted that the sealing process may include a variety of different approaches. For instance, the sealing TPM may append the hash to the information after block 610 and before the information is sealed in block 612. Then, the sealing TPM may encrypt the information along with the hash of the information in block 612. With the information sealed, the sealing TPM may return the sealed information, as shown in block 616. As another alternative embodiment of the sealing process, the sealing TPM may seal the hash of the information, which may be the identifier. The sealing TPM may seal the hash of the information after block 612, but before block 614. Then, the sealing TPM may append the sealed hash to the sealed information before returning the sealed information to the BIOS in block 616. Accordingly, with each of these different sealing processes, the sealed information may be stored in memory, such as NVRAM 140 for access by other TPMs. Beneficially, by utilizing the sealing process, the TPM utilized in the unsealing process may verify that it has unsealed the sealed information with the appropriate key. An exemplary process for unsealing the sealed information is illustrated and described with reference to FIG. 8.

Figure 8:
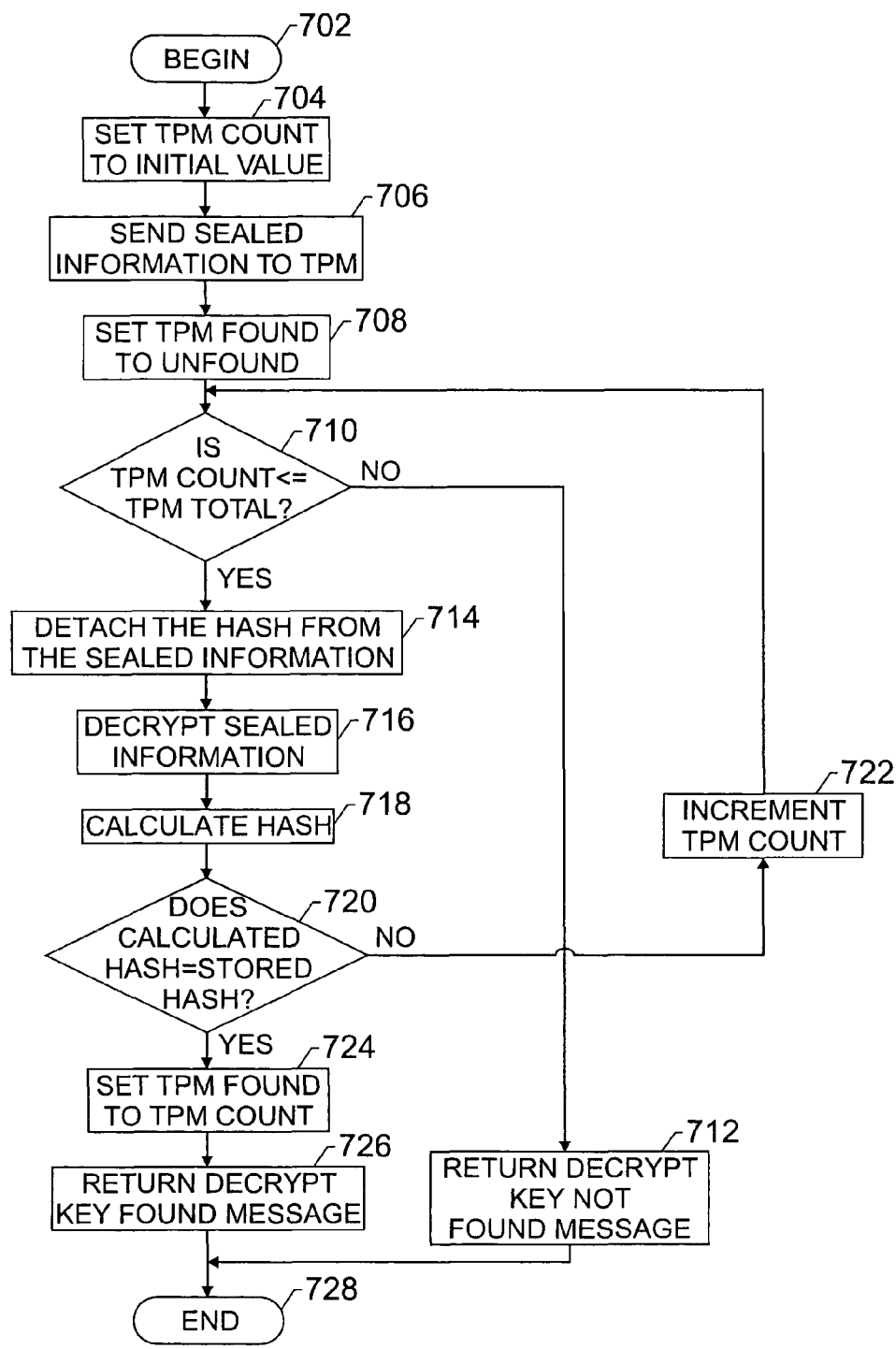
FIG. 8 is a process flow diagram illustrating a process for unsealing information that is sealed by another security module in accordance with embodiments of the present invention.

FIG. 8 is a process flow diagram illustrating a process for unsealing information that is sealed by another security module in accordance with embodiments of the present invention. The unsealing process is generally referred to by reference numeral 700. To unseal the sealed information with the appropriate key, the recipient TPM may utilize the identifier, as discussed above, to verify that the appropriate key has been utilized in the unsealing process. Beneficially, by verifying the identifier attached to or with the sealed information, the recipient TPM may verify that the key utilized to unseal the sealed information is the appropriate key.

The process begins at block 702. At block 704 the sealed information may be sent by a processor or software program to the recipient TPM to unseal the sealed information. At block 706, the recipient TPM may set the TPM count to an initial value. The initial value may be a setting or value that corresponds to one of the TPMs within the system. Then, at block 708, the recipient TPM may set a variable, which may be called "TPM found," to indicate whether the key for the sealing TPM has been identified. The variable, which may be "unfound," may be indicated by setting the value of TPM found to a "−1" or any other value to indicate that the TPM found is not associated with a valid recipient TPM.

Accordingly, the recipient TPM may utilize the key associated with the TPM count to verify that the key is the appropriate key, as shown in blocks 710-718. At block 710, the recipient TPM may determine if the TPM count is less than the total TPMs for the system. The TPM total may be a setting that indicates the number of keys stored in memory and associated with other TPMs. If the TPM count is greater than the TPM total, then the recipient TPM may return a decrypt key not found message, as shown in block 712. The decrypt key not found message may include an indication that the recipient TPM does not have the appropriate key to unseal the sealed information. However, if the recipient TPM count is less than or equal to the TPM total, then the recipient TPM may detach the hash from the sealed information, as shown in block 714. Then, the recipient TPM may decrypt the sealed information, as shown in block 716. Once the sealed information has been decrypted with the key associated with the TPM count, the recipient TPM may calculate the hash of the information, as shown in block 718.

At block 720, the recipient TPM may determine if the calculated hash equals the stored hash associated with the sealed information. If the calculated hash and the stored hash are not equal, then the key associated with the TPM count is not the key that was used to seal the information. Accordingly, the recipient TPM may increment the TPM count, as shown in block 722. Incrementing the TPM count may include modifying the value of the TPM count to another TPM key that has not been utilized to unseal the sealed information. Once the TPM count has been incremented, the recipient TPM may determine if the TPM count is less than or equal to the TPM total in block 710, as discussed above. However, if the calculated hash equals the stored hash, then the key associated with the TPM count is the appropriate key. The recipient TPM may set the TPM found to the value of the TPM count, as shown in block 724. Then, the recipient TPM may return a decrypt key found message, as shown in block 726. The decrypt key found message may include the TPM key or the TPM count that indicates the appropriate key to be used to decrypt the sealed information. Accordingly, after blocks 712 and 726, the process ends at block 728.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims

What is claimed is:

1. A method of unsealing information from a plurality of security modules, the method comprising the acts of:
    detaching an identifier from sealed information for one of the plurality of security modules;
    decrypting the sealed information with a key that is associated with another of the plurality of security modules;
    calculating a hash of the decrypted sealed information; and
    comparing the calculated hash to the identifier to determine if the key was used to encrypt the sealed information;
    returning a decrypt key found message if the key is the key used to encrypt the sealed information or returning a decrypt key not found message if the key is not the key used to encrypt the sealed information.

2. The method set forth in claim 1, wherein the plurality of security modules comprise trusted platform modules ("TPMs").

* * * * *